Patented July 25, 1939

2,167,385

UNITED STATES PATENT OFFICE 2,167,385

VULCANIZATION ACCELERATOR

Marion W. Harman, Nitro, W. Va., assignor to Monsanto Chemical Company, St. Louis, Mo., a corporation of Delaware No Drawing. Application May 26, 1936, Serial No. 81,911

25 Claims. (Cl. 18—53)

The present invention relates to new vulcanization accelerators, to a process of vulcanizing rubber and to the vulcanized rubber products obtained with the aid of the said new compounds.

The new and preferred class of rubber vulcanization accelerators comprise the products formed by reacting an amine with a cyan-thio-form-aromatic amide. The cyan-thio-form-aromatic amides may be assigned the formula of R.NH.CS.CN where R is an aromatic radical, and may be prepared by the method of Arnold Reissert and Kurt Bruggemann, Berichte der Deutschen Chemischen Gesellschaft, 57, 981–989 (1924) by reacting an aromatic mustard oil with an alkali metal cyanide, after which the solution so formed is acidified. The materials of the present invention may be produced by reacting a cyan-thio-form-aromatic amide as described above with an amine and preferably an amine having a high dissociation constant, and are believed to possess the structural formula of

R.N.CS.CN
|
HR' where R is an aromatic radical and R' is an amine and preferably an amine having a high dissociation constant.

While the compounds of the present invention possess accelerating action when employed alone as the sole organic vulcanization accelerator, they are found to possess surprising activating action when employed in conjunction with thiazole accelerators, and are preferably employed in conjunction therewith.

As specific examples of the present invention are the diphenyl guanidine, di ortho tolyl guanidine, piperidine, ethylene diamine, cyclohexylamine, ethanolamine, di-n-butyl amine, phenyl biguanide, diethyl amine and analogous salts of cyan-thio-formanilide, cyan-thio-form-alpha-naphthalide, cyan-thio-ortho-toluidide, cyan-thio-para-toluidide, cyan-thio-meta-xylidide and their analogues and equivalents.

Example I 67.5 parts by weight of phenyl mustard oil (one-half a molecular proportion) were dissolved in a convenient amount of an organic solvent, for example 200 parts by weight of ethyl alcohol, and 25 parts by weight of sodium cyanide dissolved in water, for example 360 parts by weight thereof, are added thereto at room temperature with vigorous agitation. On diluting with water and acidifying with an acid as for example hydrochloric acid, the precipitate which formed was separated and purified by redissolving in a dilute aqueous sodium carbonate solution and reprecipitating with hydrochloric acid. The product so formed after washing with water and drying, melted at 80–81° C. 16.2 parts by weight of the product so formed comprising cyan-thio-formanilide (0.1 molecular proportion) were placed in a suitable reactor and 10 parts by weight of cyclohexylamine (0.1 molecular proportion) added thereto, whereupon an exothermic reaction took place forming first a viscous liquid which later set to a solid. It is believed the reaction takes place in the following manner:

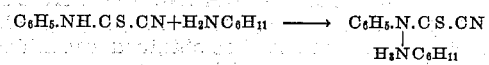

As stated above the resulting product, when employed alone, possesses accelerating properties, but when employed in conjunction with thiazole accelerators, it is found to possess surprising activating properties. The following stocks were compounded:

|  | Stock A | Stock B |
|---|---|---|
| Pale crepe rubber | 100 | 100 |
| Zinc oxide | 5 | 5 |
| Sulfur | 3 | 3 |
| Stearic acid | 1 | 1 |
| Dibenzothiazyl-thiol-dimethylurea | 1 | 0.6 |
| Cyclohexylamine cyan-thio-formanilide | 0 | 0.1 |

The rubber stocks so compounded were vulcanized and the following tensile and modulus results obtained on the cured rubber products:

Table I

| Stock | Cure | | Modulus of elasticity in lbs/in.² at elongations of— | | Tensile at break lbs/in.² | Ult. elong., percent |
|---|---|---|---|---|---|---|
| | Time, minutes | Pounds steam pressure | 500% | 700% | | |
| A | 30 | 20 | 150 | 478 | 1765 | 930 |
| B | 30 | 20 | 298 | 1295 | 2760 | 840 |
| A | 45 | 20 | 247 | 976 | 2300 | 845 |
| B | 45 | 20 | 430 | 1865 | 3070 | 790 |
| A | 60 | 20 | 323 | 1343 | 2740 | 835 |
| B | 60 | 20 | 454 | 2160 | 3280 | 775 |
| A | 90 | 20 | 460 | 1940 | 3005 | 780 |
| B | 90 | 20 | 588 | 2625 | 3480 | 735 |

From the data set forth in Table I it is shown that the preferred materials, for example cyclohexylamine cyan-thio-formanilide, is an exceptionally strong activator when employed in conjunction with thiazole accelerators.

Example II

Substantially equi-molecular proportions of diphenyl guanidine and cyan-thio-formanilide were heated in the presence of alcohol as a solvent and the product so obtained, after the elimination of the solvent, incorporated in a rubber stock comprising:

| | Parts |
|---|---|
| Pale crepe rubber | 100 |
| Zinc oxide | 5 |
| Sulfur | 3 |
| Stearic acid | 1 |
| Dibenzothiazyl-thiol-dimethylurea | 0.6 |
| Diphenyl guanidine cyan-thio-formanilide | 0.1 |

The compounded rubber stock was vulcanized with the following result:

Table II

| Cure | | Modulus of elasticity in lbs/in.² at elongations of— | | Tensile at break in lbs/in.² | Ult. elong., percent |
|---|---|---|---|---|---|
| Minutes | Pounds steam pressure | 500% | 700% | | |
| 30 | 20 | 196 | 903 | 2845 | 920 |
| 45 | 20 | 304 | 1340 | 3595 | 875 |
| 60 | 20 | 377 | 1715 | 3740 | 840 |
| 90 | 20 | 483 | 2065 | 4300 | 835 |

Example III

Substantially equi-molecular proportions of piperidine and cyan-thio-formanilide were reacted in a manner analogous to that employed in Example I. The dark solid so obtained was milled into a rubber stock comprising

| | Parts |
|---|---|
| Pale crepe rubber | 100 |
| Zinc oxide | 5 |
| Sulfur | 3 |
| Stearic acid | 1 |
| Dibenzothiazyl-thiol-dimethylurea | 0.6 |
| Piperidine cyan-thio-formanilide | 0.1 |

The compounded stock was cured and the results obtained as given in Table III.

Table III

| Cure | | Modulus of elasticity in lbs/in.² at elongations of— | | Tensile at break in lbs/in.² | Ult. elong., percent |
|---|---|---|---|---|---|
| Minutes | Pounds steam pressure | 500% | 700% | | |
| 30 | 20 | 188 | 736 | 2345 | 910 |
| 45 | 20 | 303 | 1295 | 3250 | 860 |
| 60 | 20 | 355 | 1585 | 3680 | 850 |
| 90 | 20 | 471 | 2105 | 4075 | 820 |

Example IV

Substantially two molecular proportions of cyan-thio-formanilide and substantially one molecular proportion of ethylene diamine were reacted in a manner analogous to that employed in Example I. The solid product so obtained was milled in a rubber stock comprising

| | Parts |
|---|---|
| Pale crepe rubber | 100 |
| Zinc oxide | 5 |
| Sulfur | 3 |
| Stearic acid | 1 |
| Dibenzothiazyl-thiol-dimethylurea | 0.6 |
| Ethylene diamine cyan-thio-formanilide | 0.1 |

The tensile and modulus characteristics obtained on the cured rubber product follow in Table IV:

Table IV

| Cure | | Modulus of elasticity in lbs/in.² at elongations of— | | Tensile at break in lbs/in.² | Ult. elong., percent |
|---|---|---|---|---|---|
| Minutes | Pounds steam pressure | 500% | 700% | | |
| 30 | 20 | 199 | 821 | 2070 | 865 |
| 45 | 20 | 306 | 1268 | 2540 | 815 |
| 60 | 20 | 396 | 1575 | 3040 | 805 |
| 90 | 20 | 500 | 2225 | 2890 | 750 |

Example V

Substantially equi-molecular proportions of cyan-thio-formanilide and ethanolamine were reacted in a manner analogous to that employed in Example I. The viscous liquid so obtained was milled in a rubber stock comprising

| | Parts |
|---|---|
| Pale crepe rubber | 100 |
| Zinc oxide | 5 |
| Sulfur | 3 |
| Stearic acid | 1 |
| Dibenzothiazyl-thiol-dimethylurea | 0.6 |
| Ethanolamine cyan-thio-formanilide | 0.1 |

The test results on the vulcanized rubber product follow in Table V.

Table V

| Cure | | Modulus of elasticity in lbs/in.² at elongations of— | | Tensile at break in lbs/in.² | Ult. elong., percent |
|---|---|---|---|---|---|
| Minutes | Pounds steam pressure | 500% | 700% | | |
| 30 | 20 | 168 | 644 | 2020 | 905 |
| 45 | 20 | 264 | 1130 | 2380 | 840 |
| 60 | 20 | 318 | 1360 | 2685 | 820 |
| 90 | 20 | 481 | 2045 | 2995 | 770 |

Example VI

Substantially equi-molecular proportions of di ortho tolyl guanidine and cyan-thio-formanilide were reacted in the presence of a convenient solvent, for example ethyl alcohol, in a manner analogous to that employed in Example II. The viscous liquid so obtained was milled into a rubber stock comprising

| | Parts |
|---|---|
| Pale crepe rubber | 100 |
| Zinc oxide | 5 |
| Sulfur | 3 |
| Stearic acid | 1 |
| Dibenzothiazyl-thiol-dimethylurea | 0.6 |
| Di ortho tolyl guanidine cyan-thio-formanilide | 0.1 |

The tensile and modulus data obtained on the vulcanized rubber product are given in Table VI.

Table VI

| Cure | | Modulus of elasticity in lbs/in.² at elongations of— | | Tensile at break in lbs/in.² | Ult. elong., percent |
|---|---|---|---|---|---|
| Minutes | Pounds steam pressure | 500% | 700% | | |
| 30 | 20 | 230 | 910 | 2465 | 880 |
| 45 | 20 | 368 | 1560 | 2940 | 815 |
| 60 | 20 | 405 | 1915 | 3380 | 805 |
| 90 | 20 | 620 | 2700 | 3650 | 755 |

*Example VII*

Substantially equi-molecular proportions of di-n-butyl amine and cyan-thio-formanilide were reacted in a manner analogous to that employed in the preparation of Example I. The yellow solid so obtained was incorporated in the usual manner into a rubber stock comprising

|  | Parts |
|---|---|
| Pale crepe rubber | 100 |
| Zinc oxide | 5 |
| Sulfur | 3 |
| Stearic acid | 1 |
| Dibenzothiazyl-thiol-dimethylurea | 0.6 |
| Di-n-butyl amine cyan-thio-formanilide | 0.1 |

The tensile and modulus data on the vulcanized rubber product are given in Table VII.

*Table VII*

| Cure | | Modulus of elasticity in lbs/in.$^2$ at elongations of— | | Tensile at break in lbs/in.$^2$ | Ult. elong., percent |
|---|---|---|---|---|---|
| Minutes | Pounds steam pressure | 500% | 700% | | |
| 30 | 20 | 192 | 770 | 2060 | 880 |
| 45 | 20 | 315 | 1270 | 2650 | 830 |
| 60 | 20 | 362 | 1583 | 2930 | 810 |
| 90 | 20 | 540 | 2340 | 3215 | 760 |

*Example VIII*

Substantially equi-molecular proportions of cyan-thio-form-alpha-naphthalide and cyclohexylamine were reacted in a manner analogous to that employed in Example I. The resinous solid obtained in the manner described was milled in a rubber stock comprising

|  | Parts |
|---|---|
| Pale crepe rubber | 100 |
| Zinc oxide | 5 |
| Sulfur | 3 |
| Stearic acid | 1 |
| Dibenzothiazyl-thiol-dimethylurea | 0.6 |
| Cyclohexylamine cyan-thio-form-alpha-naphthalide | 0.1 |

The tensile and modulus data on the vulcanized rubber product are given in Table VIII.

*Table VIII*

| Cure | | Modulus of elasticity in lbs/in.$^2$ at elongations of— | | Tensile at break in lbs/in.$^2$ | Ult. elong., percent |
|---|---|---|---|---|---|
| Minutes | Pounds steam pressure | 500% | 700% | | |
| 30 | 20 | 262 | 1270 | 2730 | 835 |
| 45 | 20 | 392 | 1800 | 3200 | 800 |
| 60 | 20 | 475 | 2180 | 3215 | 755 |
| 90 | 20 | 594 | 2500 | 3335 | 755 |

As further specific embodiments of the present invention, but not to be understood as limitative of the scope thereof, the following stocks were compounded comprising

|  | Stock A | Stock B | Stock C | Stock D |
|---|---|---|---|---|
|  | Parts | Parts | Parts | Parts |
| Pale crepe rubber | 100 | 100 | 100 | 100 |
| Zinc oxide | 5 | 5 | 5 | 5 |
| Sulfur | 3 | 3 | 3 | 3 |
| Stearic acid | 0.5 | 0.5 | 0.5 | 0.5 |
| Mercaptobenzothiazole | 0.75 | 0.075 | | |
| Benzothiazyl-thio-benzoate | | | 0.75 | 0.75 |
| Cyclohexylamine cyan-thio-formanilide | | 0.10 | | 0.10 |

The stocks so compounded were vulcanized and the cured rubber product found on testing to possess the following modulus and tensile characteristics:

*Table IX*

| Stock | Cure | | Modulus of elasticity in lbs/in.$^2$ at elongations of— | | Tensile at break in lbs/in.$^2$ | Ult. elong. Percent |
|---|---|---|---|---|---|---|
|  | Time, minutes | Pounds steam pressure | 500% | 700% | | |
| A | 30 | 20 | 181 | 608 | 1940 | 910 |
| B | 30 | 20 | 414 | 1795 | 3210 | 800 |
| C | 30 | 20 | 63 | 103 | 815 | 1095 |
| D | 30 | 20 | 156 | 548 | 2010 | 915 |
| A | 45 | 20 | 216 | 877 | 2015 | 840 |
| B | 45 | 20 | 488 | 2150 | 3330 | 775 |
| C | 45 | 20 | 90 | 264 | 1230 | 960 |
| D | 45 | 20 | 199 | 923 | 2430 | 860 |
| A | 60 | 20 | 293 | 1063 | 2575 | 860 |
| B | 60 | 20 | 527 | 2315 | 3510 | 785 |
| C | 60 | 20 | 157 | 500 | 1725 | 915 |
| D | 60 | 20 | 311 | 1270 | 2930 | 830 |
| A | 90 | 20 | 382 | 1263 | 2880 | 835 |
| B | 90 | 20 | 503 | 2160 | 3665 | 805 |
| C | 90 | 20 | 216 | 825 | 2180 | 875 |
| D | 90 | 20 | 369 | 1690 | 3170 | 815 |

As is shown from the data hereinbefore set forth the new and preferred class of compounds are particularly strong activators for thiazole accelerators. The new and preferred class of compounds may conveniently be employed with other thiazole accelerators than those specifically set forth above. Thus, they may be employed in conjunction with dibenzothiazyl disulfide, mercaptonaphthathiazole, mercaptotolylthiazole, dinitrophenyl-benzothiazyl-sulfide and analogues and equivalents thereof.

This invention is not restricted to the use of the particular compounds given in the specification as specific examples, nor is it restricted to the use of the preferred class of compounds in the particular rubber mixes hereinbefore described. The invention is limited solely by the claims attached hereto as part of the present specification.

What is claimed is:

1. The process of vulcanizing rubber which comprises heating rubber and sulfur in the presence of a thiazole accelerator and in addition thereto a reaction product of substantially one molecular proportion of a cyan-thio-form-aromatic amide and an equivalent amount of an amine having a dissociation constant at least equal to that of ethanol amine, said reaction being effected without the addition of heat.

2. The process of vulcanizing rubber which comprises heating rubber and sulfur in the presence of a thiazole accelerator and in addition thereto an amine salt of a cyan-thio-form-aromatic amide, said amine of said salt having a dissociation constant at least equal to that of ethanol amine.

3. The process of vulcanizing rubber which comprises heating rubber and sulfur in the presence of a mercaptoaryl-thiazole accelerator and in addition thereto an amine salt of a cyan-thio-form-aromatic amide, said amine of said salt having a dissociation constant at least equal to that of ethanol amine.

4. The process of vulcanizing rubber which comprises heating rubber and sulfur in the presence of a mercaptoaryl-thiazole accelerator and in addition thereto an amine salt of a cyan-thio-formanilide, said amine of said salt having a dissociation constant at least equal to that of ethanol amine.

5. The process of vulcanizing rubber which comprises heating rubber and sulfur in the presence of a mercaptobenzo-thiazole accelerator and in addition thereto an amine salt of cyan-thio-formanilide, said amine of said salt having a dissociation constant at least equal to that of ethanol amine.

6. The process of vulcanizing rubber which comprises heating rubber and sulfur in the presence of an amine salt of a cyan-thio-form-aromatic amide, said amine of said salt having a dissociation constant at least equal to that of ethanol amine.

7. The process of vulcanizing rubber which comprises heating rubber and sulfur in the presence of an amine salt of a cyan-thio-formanilide, said amine of said salt having a dissociation constant at least equal to that of ethanol amine.

8. The process of vulcanizing rubber which comprises heating rubber and sulfur in the presence of dibenzothiazyl-thiol-dimethyl urea and in addition thereto cyclohexylamine cyan-thio-formanilide.

9. The process of vulcanizing rubber which comprises heating rubber and sulfur in the presence of dibenzothiazyl-thiol-dimethyl urea and in addition thereto ethanolamine cyan-thio-formanilide.

10. The process of vulcanizing rubber which comprises heating rubber and sulfur in the presence of dibenzothiazyl-thiol-dimethyl urea and in addition thereto diphenylguanidine cyan-thio-formanilide.

11. The vulcanized rubber product produced by heating rubber and sulfur in the presence of a thiazole accelerator and in addition thereto an amine salt of a cyan-thio-form-aromatic amide, said amine of said salt having a dissociation constant at least equal to that of ethanol amine.

12. The vulcanized rubber product produced by heating rubber and sulfur in the presence of a mercaptoarylthiazole accelerator and in addition thereto an amine salt of a cyan-thio-form-aromatic amide, said amine of said salt having a dissociation constant at least equal to that of ethanol amine.

13. The vulcanized rubber product produced by heating rubber and sulfur in the presence of a mercaptoarylthiazole accelerator and in addition thereto an amine salt of a cyan-thio-formanilide, said amine of said salt having a dissociation constant at least equal to that of ethanol amine.

14. The vulcanized rubber product produced by heating rubber and sulfur in the presence of a mercaptobenzothiazole accelerator and in addition thereto an amine salt of a cyan-thio-formanilide, said amine of said salt having a dissociation constant at least equal to that of ethanol amine.

15. The vulcanized rubber product produced by heating rubber and sulfur in the presence of an amine salt of a cyan-thio-form-aromatic amide, said amine of said salt having a dissociation constant at least equal to that of ethanol amine.

16. The vulcanized rubber product produced by heating rubber and sulfur in the presence of an amine salt of a cyan-thio-formanilide, said amine of said salt having a dissociation constant at least equal to that of ethanol amine.

17. The vulcanized rubber product produced by heating rubber and sulfur in the presence of dibenzothiazyl-thiol-dimethyl urea and in addition thereto cyclohexylamine cyan-thio-formanilide.

18. The vulcanized rubber product produced by heating rubber and sulfur in the presence of dibenzothiazyl-thiol-dimethyl urea and in addition thereto ethanolamine cyan-thio-formanilide.

19. The vulcanized rubber product produced by heating rubber and sulfur in the presence of dibenzothiazyl-thiol-dimethyl urea and in addition thereto diphenyl guanidine cyan-thio-formanilide.

20. The process of vulcanizing rubber which comprises heating rubber and sulfur in the presence of cyclohexylamine cyan-thio-formanilide.

21. The process of vulcanizing rubber which comprises heating rubber and sulfur in the presence of ethanolamine cyan-thio-formanilide.

22. The process of vulcanizing rubber which comprises heating rubber and sulfur in the presence of diphenylguanidine cyan-thio-formanilide.

23. The vulcanized rubber product produced by heating rubber and sulfur in the presence of cyclohexylamine cyan-thio-formanilide.

24. The vulcanized rubber product produced by heating rubber and sulfur in the presence of ethanol amine cyan-thio-formanilide.

25. The vulcanized rubber product produced by heating rubber and sulfur in the presence of diphenyl guanidine cyan-thio-formanilide.

MARION W. HARMAN.